Patented Nov. 20, 1945

2,389,416

UNITED STATES PATENT OFFICE 2,389,416

COMPOUNDS PRODUCED FROM SALTS OF SULPHAMIC ACID AND THEIR PREPARATION

Gaetano F. D'Alelio, Northampton, Mass., assignor to General Electric Company, a corporation of New York No Drawing. Original application February 17, 1939, Serial No. 256,998. Divided and this application August 6, 1943, Serial No. 497,682

20 Claims. (Cl. 260—69)

This application is a division of my copending application Serial No. 256,998, filed February 17, 1939, and assigned to the same assignee as the present invention.

This invention relates broadly to new and useful compositions of matter comprising new reaction products, more particularly new compounds or products prepared from salts of amphoteric aminosulphonic acids, more particularly salts of sulphamic acid, and to methods of preparing the same.

The invention claimed in the present application differs from that claimed in my copending parent application Serial No. 256,998 in that it is directed to (A) the product obtained by effecting reaction between ingredients including a salt of sulphamic acid, formaldehyde and a polyamide selected from the class consisting of urea, thiourea, malonic diamide, succinic diamide, citric triamide and phthalamide; (B) the product obtained by bringing into contact at reaction temperature (1) a polyamide of the aforementioned class, e. g., urea, and (2) a reaction product of formaldehyde and a salt of sulphamic acid, more particularly a sulphamate of an alkaline-earth metal and specifically calcium sulphamate, the said reaction product containing a methylol grouping; and (C) the product produced by reacting a polyamide of the aforementioned class, specifically urea, with the reaction product of formaldehyde and a salt of sulphamic acid, the said reaction being effected by the application of heat. Method features of the invention claimed herein include (A) the process which comprises effecting reaction between ingredients including (1) a salt (including the normal salt) of sulphamic acid, e. g., calcium sulphamate, (2) formaldehyde, and (3) a polyamide of the aforementioned class, e. g., urea; (B) the process which comprises effecting reaction between ingredients including a methylol sulphamate and polyamide of the aforementioned class, specifically urea; and (C) the process which comprises reacting a salt (including the normal salt) of sulphamic acid with formaldehyde to form a methylol derivative thereof, and thereafter reacting said methylol derivative with a polyamide of the aforementioned class, specifically urea.

The organic amphoteric substances and their derivatives used in practicing this invention are not to be confused with the proteids and partially hydrolyzed proteids, examples of which are glycinin, zein, casein, legumin, gliadin and phaseolin, merely to mention a few. These proteid compounds are non-crystalloidal, water-insoluble bodies having polypeptide linkages and the colloidal properties of the high molecular weight proteins, as exemplified by viscosity and osmotic pressure phenomena. When the proteids or their alkali salts are plasticized, for example with water, alcohol, etc., or when they are reacted with active methylene-containing bodies, in either case plastic compositions are obtained. In contrast with the proteids the amphoteric substances and their derivatives employed in carrying this invention into effect are crystalloids, or, if impure, may be obtained in crystalline form by simple recrystallization processes. They exhibit the properties typical of crystalloids, for example, sharp melting or decomposition temperatures. In solution, the values of their freezing point depressions, boiling point elevations and osmotic pressures can be approximated by simple calculations.

The free amino acids represent the simplest aldehyde-reactable organic amphoteric substances having no polypeptide linkages that are known. Theoretically the simplest possible amino acid would be carbamic acid or aminoformic acid, $NH_2COOH$, which, however, is not known to exist in the free state. Derivatives of carbamic acid, such as ammonium carbamate, $NH_2COONH_4$, and ethyl carbamate, $$NH_2COOC_2H_5$$

are known and are quite stable. Of the amino acids, glycine or aminoacetic acid, $NH_2CH_2COOH$, is the simplest known to exist in the free state.

It will be noted that such organic amphoteric substances as amino acids, of which glycine is one of numerous examples, contain both an acid group, —COOH, and a basic group, —NH₂. The amphoteric substances on ionization give simultaneously two ions, one negatively charged and the other positively charged, leaving a residual molecule with two equal and opposite charges. Ionically, the equilibrium may be represented thus:

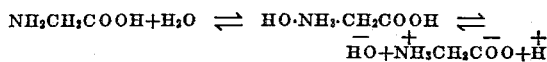

It is known that free or uncombined amino acids (hereinafter for brevity referred to merely as "amino acids"), for example aminocarboxylic acids and aminosulphonic acids, can react with basic substances such as sodium and potassium carbonates and hydroxides, ammonia, trimethyl amine, pyridine, morpholine, aniline, cyclohexylamine, naphthylamine, diethanolamine and the like to give the corresponding salts of the amino acid. These salts are basic not because of the added alkali, but because the —NH₂ group of the amino acid has been freed of the neutralizing effect of, in the case of an aminocarboxylic acid, the —COOH group, this group being neutralized by the added base. Thus, sodium glycinate, NH₂CH₂COONa, is alkaline in its reactions. Similarly, the original —NH₂ group of the amino acid can be neutralized by added acid, such as sulphuric, hydrochloric, acetic, benzoic and the like, resulting, in the case of glycine, in acidic glycine salts. In these salts the acidic group, for example the —COOH group, is free to ionize as an acid, since the influence of the —NH₂ group has been removed by the added acid. Thus, glycine hydrochloride, HCl.NH₂CH₂COOH is acidic in nature.

It is also known that the amino acids can be reacted (condensed) with aldehydes to give methylol derivatives. For example, when formaldehyde and glycine are condensed, acidic methylol glycine, HOCH₂NHCH₂COOH, is obtained. However, if more than one hydrogen of the amino group is replaced by R (alkyl, aryl or aralkyl group), the resulting substituted amino acid will not react with an aldehyde. Thus, taking a substituted glycine wherein one of the amino hydrogens of the original glycine, NH₂CH₂COOH, is replaced by R to produce RNHCH₂COOH, such substituted glycine is capable of reacting with an aldehyde. On the other hand, when both hydrogens of the nitrogen group are replaced by R, the resulting substituted glycine, R₂NCH₂COOH, is incapable of reacting with aldehydes to form methylol derivatives. By an aldehyde-reactable organic amphoteric substance, specifically an aldehyde-reactable amino acid, as used herein, is accordingly meant a substance capable of reacting with an aldehyde to form a methylol derivative, more particularly with reference to an amino acid one wherein at least one hydrogen of the amino group is available for replacement by a methylol grouping.

The amino acids usually are classed according to their chemical nature.

Class I includes the aliphatic monoamino monocarboxylic acids such as glycine or glycocoll, alanine, alpha-amino butyric acid, alpha-amino valeric acid, valine or alpha-isopropyl alphaamino acetic acid, glycoleucine, leucine or alphaisobutyl alpha-amino acetic acid, isoleucine or alpha-amino beta-ethyl beta-methyl propionic acid, serine or beta-hydroxy alpha-amino propionic acid, and cysteine or beta-thio alphaamino propionic acid.

Class II includes the monoamino dicarboxylic acids such as aspartic acid and glutamic acid.

Class III embraces the isocyclic amino acids such as tyrosine and phenyl alanine.

Class IV includes the heterocyclic amino acids such as tryptophane or alpha-amino-3-indolepropionic acid, proline which is 2-pyrrolidinecarboxylic acid, histidine or alpha-amino-5-imidazolepropionic acid and hydroxyproline.

Class V includes the diamino monocarboxylic acids such as arginine or alpha-amino deltaguanidinovaleric acid and lysine or alpha,epsilondiaminocaproic acid.

Class VI includes the heterogeneous amino acids, examples of which are the ortho-, metaand para-amino benzoic acids, beta-amino propionic acid, sulphamic acid or aminosulphonic acid (NH₂SO₂OH), and beta-aminoethyl sulphonic acid (NH₂CH₂CH₂SO₂OH).

I have discovered that the reaction product of an aldehyde-reactable organic amphoteric substance which does not have polypeptide linkages (examples of which have been given above), or one of its derivatives, e. g., a salt thereof, and an aldehyde (e. g., formaldehyde, acetaldehyde, propionaldehyde, butyraldehyde, acrolein, methacrolein, benzaldehyde, etc., or compounds engendering aldehydes such as paraformaldehyde and paraldehyde) can be reacted with, for example, amides to give new and useful compositions of matter, characteristic properties of which are hereinafter given. If we designate any of the amphoteric substances or their derivatives in the six classes above described as

an aldehyde as R'CHO, and an amide as

the general equation for the reaction may be written as follows:

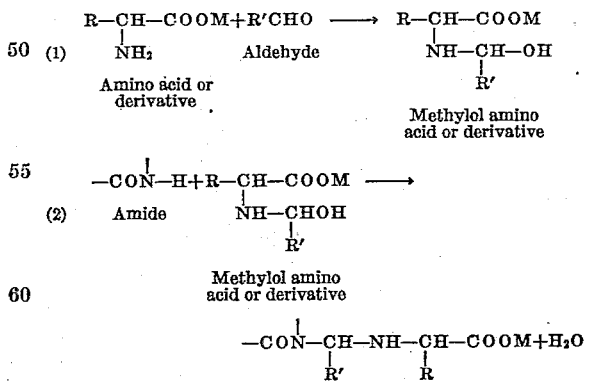

R and R' in the above formulas may be hydrogen (H) or an alkyl, aryl or aralkyl grouping, and M may be hydrogen or any modification that can be substituted for the hydrogen (H) of a —COOH (or —SO₂OH) radical, as hereafter more fully explained.

The above reaction is general and is not limited to condensations involving organic compounds containing only one amide group, or merely to amides of oxygen acids. The amide oxygen atom may be replaced by its equivalent, such as sulphur as in the thioamides,

or by the imino group as in the amidines,

or in general by X as in

where X represents an element or radical bonded to the carbon atom by a double bond. The reaction does not exclude polyamides, which are compounds containing a plurality of amidogen (—NH$_2$) groups, since the number of amide groups does not affect the nature of the reaction. For example, carbamide (urea), thiocarbamide (thiourea) and amides of polybasic acids, for instance malonic diamide, succinic diamide, citric triamide, phthalamide and the like, may be used.

Since the reaction between the aldehyde and the amphoteric substance used in practicing this invention depends on the —NH$_2$ group of the amphoteric substance, the remainder of the amphoteric molecule may be modified in the form of a derivative such as the lithium, barium, calcium, sodium or potassium salts, the ammonium salt, the organic ammonium salts (amine salts), the esters, the amides or, in general, the modifications that can be introduced to an organic radical such as —COOH or the inorganic radical —SO$_2$OH. In such salts, esters and amides the substituent grouping, in the case of salts and esters, replaces the hydrogen of the —OH group of the acid radical and, in the case of amides, the —NH$_2$ grouping replaces the —OH group of the acid radical, thereby yielding what are commonly designated as normal salts, esters and amides. (The term "normal" is sometimes used in chemistry synonomously with the term "neutral"; see Webster's New International Dictionary, second edition, unabridged, G. and C. Merriam Company, Springfield, Mass, 1943.) Thus, I have found that I can condense, for example, sodium glycinate and formaldehyde to give methylol sodium glycinate and that the latter can be condensed with an amide such as acetamide to give the sodium salt of N-(methylene glycine) acetamide,

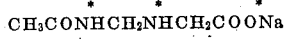

Upon acidification of this sodium salt with an inorganic acid N-(methylene glycine) acetamide,

is obtained. The starred positions in the above formulas and in formulas hereinafter given designate potentially reactive positions.

It is not necessary to isolate the methylol derivatives of the amphoteric substance before condensation with the amide. The aldehyde and the amphoteric substance, specifically an aldehyde-reactable amino acid, may be mixed in a suitable solution, as for example in aqueous solution, and allowed to react, followed by the addition of an amide. The reaction is allowed to proceed either at room temperature or at any suitable elevated temperature up to and including the boiling point (boiling temperature) of the solution (reaction mixture) at atmospheric or superatmospheric pressures. Advantageously the reaction is carried out under refluxing (boiling) conditions, the reaction vessel being provided with a suitable reflux column for this purpose.

I have also found that the desired end-products can be obtained in a one-step process by initially mixing all the reactants together, specifically an amide, an aldehyde and an aldehyde-reactable organic amphoteric substance free from polypeptide linkages (with or without one of its derivatives) and simultaneously reacting these components. In this case the reaction which takes place may be written thus:

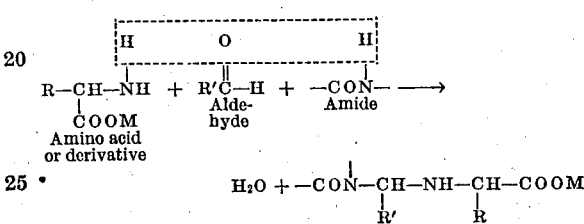

R, R' and M appearing in the above formulas have the same meanings as previously explained with reference to a two-step reaction between the components.

The condensation of the methylol compound, specifically the methylol amino acid, and amide proceeds under neutral, acid or alkaline conditions, although in certain cases, as for example in the production of certain resinous condensation products, definite predetermined conditions of acidity or alkalinity advantageously may be employed.

In technical processes embodying pH control, considerable difficulty is often encountered in maintaining the definite limits required for certain condensations or reactions. These pH conditions are usually obtained by the addition of substances foreign to the reaction performed. These substances are usually acids, alkalies or salts which function as buffers. I have found that definite conditions of pH can be readily and easily obtained by using a definite, predetermined adjusted ratio of the herein-defined amphoteric substance to one of its derivatives, for example a sodium or potassium salt thereof, as hereafter more fully described. This control of pH differs fundamentally from the standard or conventional processes in that the control comes from an internal mechanism whereby the molecules of the reactants, as well as the molecules resulting from the reaction, act to control the pH conditions.

I have also discovered that the ratio of the reactants to each other has material influence upon the composition and characteristics of the final product. In the case of monoamides the ratio of reactants is naturally limited, because the amphoteric substance and the amide each have only one reactive position. With polyamides, however, the ratio of reactants can be varied over a wide range, due to the plurality of reactive positions in the amide molecule. The effect of mol ratios of reactants upon the nature of the final products will be understood more readily by reference to Table I, wherein glycine is mentioned as illustrative of an amphoteric substance, urea as illustrative of a polyamide, and formaldehyde as illustrative of an aldehyde.

Table I

| | Mol ratio of reactants | | | Reaction product comprising mainly— |
|---|---|---|---|---|
| | Glycine | Urea | Formaldehyde | |
| A | 1 | $n$ | $2n$ | $(-\overset{*}{C}H_2-\overset{*}{N}-\overset{*}{C}ONH\overset{*}{C}H_2)_n\overset{*}{N}H\overset{*}{C}H_2\overset{*}{C}OOH$ |
| B | 1 | $n$ | $n$ | $\overset{*}{N}H_2\overset{*}{C}ON\overset{*}{H}\overset{*}{C}H_2-(\overset{*}{N}H\overset{*}{C}ON\overset{*}{H}\overset{*}{C}H_2)_{n-1}\overset{*}{N}H\overset{*}{C}H_2\overset{*}{C}OOH$ |
| C | 1 | 1 | 1 | $\overset{*}{N}H_2\overset{*}{C}ON\overset{*}{H}\overset{*}{C}H_2\overset{*}{N}H\overset{*}{C}H_2\overset{*}{C}OOH$ |
| D | 1 | 1 | 2 | $HO\overset{*}{C}H_2\overset{*}{N}H\overset{*}{C}ON\overset{*}{H}\overset{*}{C}H_2\overset{*}{N}H\overset{*}{C}H_2\overset{*}{C}OOH$ |
| E | 2 | 1 | 2 | $(HOO\overset{*}{C}-\overset{*}{C}H_2\overset{*}{N}H-\overset{*}{C}H_2\overset{*}{N}H)_2\overset{*}{C}O$ |

NOTE.—In the foregoing table $n$ has a numerical value of 1 or more.

When the mol ratios of reactants are relatively low, for example, as shown under C, D and E in Table I, crystalline bodies are obtained. With an increase in mol ratios of the formaldehyde, or urea and formaldehyde, with respect to the amphoteric substance, the products gradually approach a colloidal state.

The products shown by way of illustration in Table I may be described as primary products. They are potentially reactive compounds, the starred positions indicating the favorable points of reaction. They may react with themselves to produce larger molecules or they may be modified in various ways, as by reacting them with other potentially reactive compounds. The $$-\overset{*}{C}OOH$$

group, for example, may be converted to a salt, an ester, an amide, or the like. Also, some of the $$-\overset{*}{N}H_2$$

or the $$-\overset{*}{N}H-$$

groups may be reacted with more aldehyde, whereby in certain cases secondary resinous products may be obtained from crystalline primary products, which secondary products may be used as adhesives or as surface-coating materials. They also have other applications, for example, in casting, laminating and molding uses, with or without fillers, plasticizers, dyes, pigments or other modifying agents. The $$HO\overset{*}{C}H_2NH-$$

group may be reacted with alcohols to give ether compounds having the grouping $ROCH_2NH-$, where R is the residue of a monohydric or polyhydric alcohol. In the utilization of any primary condensation products for the preparation of secondary products, I need not isolate such products before further reaction.

In the preparation of primary or secondary products, the reaction may be carried out, if desired, in the absence of a solvent, or in an aqueous solvent, or in a non-aqueous solvent such as dioxane, methyl alcohol (methanol), butyl alcohol, glycol monoacetate, ethylene glycol, glycerine, diethylene glycol, ethylene glycol mono-alkyl ethers, and the like.

In the production of resinous materials, it is not necessary to use a pure or homogeneous amphoteric substance or one of its derivatives. Thus, I may use a crude or partially purified mixture of amino acids.

The products of condensation of an aldehyde, an amide and the herein-defined amphoteric substance may be recovered simply by evaporation of the solvent or by precipitation methods, followed by centrifuging or filtration.

In making the ordinary urea-aldehyde resinous condensation products, the condensation catalysts, the buffers used in pH control and the latent acidic curing catalysts are usually bodies foreign to the reaction. In marked contrast when an amide, an aldehyde and an aldehyde-reactable organic amphoteric substance free from polypeptide linkages, or its derivative, are condensed, the amphoteric substance (1) can behave as the catalyst for the condensation, and at the same time actually participate in the reaction; and (2) both as a reactant and as a product of reaction the amphoteric substance alone or in the presence of its derivative, can control the pH of the mass, not by a foreign mechanism, but by becoming an integral part of the condensation product. Further, by using a predetermined adjusted ratio of amphoteric substance to that of, say, an alkaline derivative thereof, a heat-hardenable resinous condensation product of any desired internal acid condition and of controllable curing rate can be obtained.

Taking glycine and sodium glycinate as illustrative of an amphoteric substance and of an alkaline derivative thereof, the following diagram shows the step-by-step changes which take place when each reacts first with an aldehyde, specifically formaldehyde, and then with an amide, specifically urea:

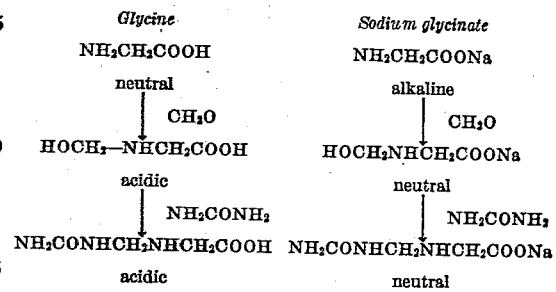

As previously pointed out, glycine, which is neutral, or sodium glycinate, which is alkaline, reacts with formaldehyde to give acidic methylol glycine, $HOCH_2NHCH_2COOH$, and neutral methylol sodium glycinate, $HOCH_2NHCH_2COONa$, respectively. However, sodium glycinate is much more reactive than glycine. Hence, by taking a solution formed of, for example, 1 mol urea, 1 mol formaldehyde, ½ mol glycine and ½ mol sodium glycinate, the alkaline glycinate condenses with the formaldehyde and the urea more rapidly than the glycine, producing a neutral molecule. At the same time the glycine also condenses with the urea and formaldehyde to produce acidic molecules. In this way there is obtained a solution with a definite pH value for a particular mixture of condensation products, specifically a mixture consisting of ½ mol of methylene glycine urea,

NH₂CONHCH₂NHCH₂COOH, and ½ mol of the sodium salt of methylene glycine urea, NH₂CONHCH₂NHCH₂COONa. On the other hand, if the original glycine-glycinate ratio were ¾ mol to ¼ mol, the final solution would be much more acidic than in the example above mentioned by reason of the fact that it would consist of ¾ mol of methylene glycine urea and ¼ mol of the sodium salt of methylene glycine urea.

From the foregoing it is evident that a mixture of glycine and glycinate in the described condensation reaction shifts the pH medium from the high or alkaline side toward the low or acid side, the desired range of pH being determined by the ratio of reactants and therefore definitely controllable. It will be understood, of course, that this is true not only of glycine and sodium glycinate, but also of other aldehyde-reactable organic amphoteric substances free from polypeptide linkages, and derivatives thereof, numerous examples of which previously have been given.

In preparing a mixture of the amphoteric substance, as for example glycine, and a derivative thereof, for instance sodium glycinate, to be condensed with an aldehyde and an amide, I need not prepare the glycine and the glycinate separately, but may form a salt of glycine by adding, for instance, a suitable alkali, as for example sodium hydroxide, to glycine itself in such an amount that the desired glycine-glycinate ratio will be obtained.

In order that those skilled in the art better may understand how the present invention may be carried into effect, the following specific examples are given by way of illustration. All parts are by weight, and the formalin is a technical grade of aqueous formaldehyde containing approximately 37.1% formaldehyde.

*Example 1*

| | Mols |
|---|---|
| Urea | 1 |
| Formaldehyde | 1 |
| Glycine | 1 |

Seven and five-tenths (7.5) parts glycine, 8.05 parts formalin and 5 parts water were mixed and allowed to stand for 15 minutes. To this solution was added a solution of 6 parts urea in 8 parts water. On addition, the mixture became hot. After about 15 minutes standing, a turbidity appeared in the solution. Part of the water was evaporated at 70° C. and an equal volume of alcohol added. The crystals were filtered from the mother liquor, giving 11.82 parts of a crude condensation product melting with decomposition at about 175° C. The material comprised N-(methylene glycine) urea,

NH₂CONHCH₂NHCH₂COOH

*Example 2*

| | Mols |
|---|---|
| Urea | 1 |
| Formaldehyde | 1 |
| Sodium glycinate (from reaction of NaOH and glycine) | 1 |

Four parts NaOH were dissolved in a minimum of water and added to 7.5 parts glycine in 5 parts water to prepare sodium glycinate. 8.05 parts formalin were next added, resulting in the liberation of heat. 6 parts urea in 8 parts water were added and the whole heated to 70° C. for ½ hour. The condensation product thereby obtained was insoluble in alcohol. The aqueous solution of the condensation product was twice extracted with an equal volume of alcohol to remove alcohol-soluble material. The aqueous solution was evaporated, leaving a white sticky mass which dried to a hard powder. It comprised the sodium salt of N-(methylene glycine) urea, NH₂CONHCH₂NHCH₂COONa. On acidification a product corresponding to that of Example 1 was obtained.

*Example 3*

| | Mols |
|---|---|
| Urea | 1 |
| Formaldehyde | 2 |
| Glycine | 2 |

Three parts urea in 4 parts water were added to a solution of 8.05 parts formalin and 7.5 parts glycine. Considerable heat was liberated. In about 2 hours a thick, hard cake of crystals was obtained. A solution formed of equal parts alcohol and water was added to make a slurry. This was followed by filtration. After drying at 70° C., 12.26 parts of a white crystalline condensation product was obtained. This product, which melted with decomposition at about 173° C., comprised N,N' - di - (methylene glycine) urea, CO(NHCH₂NHCH₂COOH)₂.

*Example 4*

| | Mols |
|---|---|
| Urea | 1 |
| Formaldehyde | 2 |
| Sodium glycinate (from reaction of NaOH and glycine) | 2 |

Four parts NaOH were dissolved in 5 parts water, and to it were added 7.5 parts glycine and 8.05 parts formalin. To this solution was added 3 parts urea in 4 parts water and the whole heated to 70° C. for ½ hour. The solution was washed with alcohol, the alcoholic extract decanted, followed by concentration of the remaining aqueous solution at 70° C. to obtain 13.65 parts of a white, sticky, gummy mass which dried to a white powder on prolonged heating. The dried condensation product comprised the disodium salt of N,N'-di-(methylene glycine) urea, CO(NHCH₂NHCH₂COONa)₂. On acidification with hydrochloric or sulphuric acid a product corresponding to that of Example 3 was obtained.

*Example 5*

| | Mols |
|---|---|
| Urea | 1 |
| Formaldehyde | 2 |
| Sodium glycinate (from reaction of NaOH and glycine) | 1 |

To a solution of 1.5 parts glycine and 0.8 part NaOH in 2 parts water there were added 1.2 parts urea and 3.24 parts formalin. The mixture was allowed to stand in a stoppered flask for 1 hour at 70° C., then evaporated, leaving 3.84 parts of a clear, homogeneous, resinous-appearing mass, which was converted to a dry white powder upon heating at 180° C. on a hot plate.

*Example 6*

| | Mols |
|---|---|
| Urea | 1 |
| Formaldehyde | 2 |
| Sodium glycinate (from reaction of NaOH and glycine) | 1 |
| Isopropyl alcohol | 1 |

To a solution of 1.5 parts glycine and 0.8 part NaOH in 2 parts water were added 1.2 parts urea, 3.24 parts formalin and 1.2 parts isopropyl alcohol. The mixture was refluxed for 1 hour. The solution was then evaporated at 70° C., leaving 3.71 parts of a light-colored condensation product with resinous characteristics. The resin advanced at 180° C. to a hard powder.

*Example 7*

| | Mols |
|---|---|
| Malonic diamide | 1 |
| Formaldehyde | 3 |
| Glycine | ½ |
| Sodium glycinate (from reaction of sodium hydroxide and glycine) | ½ |

Two-tenths (0.2) part NaOH in 2 parts water were mixed with 0.75 part glycine (corresponding to a solution of 0.485 part sodium glycinate and 0.375 part glycine). This mixture was added to 2.43 parts formalin and 1.02 parts malonic diamide and allowed to stand at room temperature for about 15 hours, resulting in a clear homogeneous solution. On evaporation of the solution at 70° C., 2.15 parts of a light greenish resin were obtained. At 180° C. the condensation product produced a thick melt, curing to a dry powder.

*Example 8*

| | Mols |
|---|---|
| Malonic diamide | 1 |
| Formaldehyde | 3 |
| Sodium glycinate (from reaction of NaOH and glycine) | 0.5 |
| Ethylene glycol | 2.5 |

To 0.375 part glycine there were added 0.2 part NaOH in 2 parts water, 0.155 part ethylene glycol, 2.43 parts formalin and 1.02 parts malonic diamide. The mixture was refluxed for 1 hour, leaving a clear, homogeneous, yellow solution. Upon evaporation, a hard, pale green, resinous condensation product which caked at body temperature was isolated.

*Example 9*

| | Mols (approximately) |
|---|---|
| Urea | 1.0 |
| Formaldehyde | 2.0 |
| Pyridine | 0.025 |
| Pyridine glycinate (from reaction of pyridine and glycine) | 0.025 |

Nineteen parts glycine, 41 parts pyridine and 300 parts water were first mixed. To the resulting solution were added 1600 parts of exactly neutral formalin (pH 7), followed by the addition of 600 parts urea. The mixture was shaken until solution occurred. The pH dropped to 6.2. The solution was then refluxed for about 2.5 hours, resulting in a clear, water-white solution of increased viscosity. Eighty parts water were then removed by vacuum distillation, leaving an aqueous resinous solution with a resin content of about 45% and a pH of 5.2. Alpha cellulose sheets were impregnated by dipping into the dehydrated resin solution. The sheets were dried at 50° C. for about 20 minutes and were laminated by molding at 130° C. under a pressure of about 2000 pounds per square inch to give a clear, homogeneous product, the translucency of which depended on the number of superposed sheets comprising the laminations.

The dry impregnated sheets may be first comminuted and ground to any desired mesh to be used in the preparation of other molded products. It is not essential, however, that the filler be impregnated in sheet form, since flock, wood flour, asbestos and the like may be first impregnated and then dried to a satisfactory condition for molding. Pigments and dyes may be added either to the resinous syrup or filler to give colored products. Opacifiers such as lithopone or titanium phthalate may be used to decrease the transparency of the molded or laminated products, thereby increasing their opacity. In many cases it is advisable to incorporate a mold lubricant into the molding composition.

If the resin solution is dehydrated to a solid content of higher than 50% and then allowed to gel, the solid resin mass may be dried at 50° C. for about 20 hours, followed by sheeting through rolls and molding directly at 130° C. to give clear, transparent molded pieces comparatively free from bubbles and blisters.

*Example 10*

| | Mols (approximately) |
|---|---|
| Urea | 1.0 |
| Formaldehyde | 2.0 |
| Glycine | 0.035 |
| Sodium glycinate (from reaction of NaOH and glycine) | 0.035 |

Two and six-tenths (2.6) parts glycine were added to 0.7 part NaOH in 20 parts water, and this solution was added to 80 parts of exactly neutral formalin (pH 7). Thirty parts urea were added and the mixture shaken until solution occurred. The mixture was allowed to stand at 35° C. plus or minus 5° C. for 10 hours. After solution occurred the pH was 6.1, which dropped to 4.3 at the completion of the reaction.

The syrup was compounded with alpha flock to give a resin content of 60%, followed by drying at 50° C. for 90 minutes. A hard, translucent disc was produced by molding the dried compound at 135° C. under a pressure of 2000 pounds per square inch. The addition of 5% dimethyl phthalate to the compound gave a molding composition of increased plasticity or flow.

*Example 11*

| | Mols (approximately) |
|---|---|
| Urea | 1.0 |
| Formaldehyde | 3.0 |
| Glycine | 0.046 |
| Sodium glycinate (from reaction of glycine and NaOH) | 0.046 |

Three and fifty-five hundredths (3.55) parts glycine and 0.95 part NaOH were dissolved in 20 parts water and the solution added to 120 parts exactly neutral (pH 7) formalin. Thirty parts urea were then added with agitation until solution occurred. The pH value of the solution at this point was 6.2. The reaction was allowed to continue at 35° C. plus or minus 5° C. for about 10 hours, ending in a pH of 4.1.

Paper sheets were impregnated with the undehydrated resin syrup to a resin content of 60% and thereafter dried at 50° C. for 90 minutes. The dried sheets were cut up into small squares and molded in the form of a disc at 135° C. under a pressure of 2000 pounds per square inch, producing a very translucent product with a high glossy surface.

Example 12

| | Mols (approximately) |
|---|---|
| Urea | 0.67 |
| Thiourea | 0.33 |
| Formaldehyde | 2.0 |
| Glycine | 0.014 |
| Sodium glycinate (from reaction of NaOH and glycine) | 0.095 |
| Isopropyl alcohol | 0.41 |

The glycine-sodium glycinate mixture was first prepared by adding 1.9 parts NaOH to 4.1 parts glycine in 30 parts water, and to it were added 80 parts neutral formalin, 20 parts urea, 13 parts thiourea and 14 parts isopropyl alcohol. The solution was refluxed for ½ hour and dehydrated to a resin content of about 50% and a final pH of 4.9. Impregnated sheets were laminated, giving laminations which were hard, glossy, water-white and exceptionally translucent.

Example 13

| | Mols (approximately) |
|---|---|
| Urea | 1.0 |
| Formaldehyde | 2.0 |
| Glycine | 0.025 |
| Pyridine glycinate (from reaction of pyridine and glycine) | 0.03 |

One and twenty-three hundredths (1.23) parts pyridine were added to 2.07 parts glycine in 25 parts water and the technique as given in Example 9 was followed, using 80 parts neutral formalin and 30 parts urea. After solution of the urea the pH was 5.8 and at the completion of the reaction had dropped to 4.3. Laminations coated and impregnated with the heat-hardened material were translucent and had a glossy surface.

Example 14

| | Mols (approximately) |
|---|---|
| Urea | 0.67 |
| Thiourea | 0.33 |
| Formaldehyde | 2.0 |
| Pyridine | 0.043 |
| Pyridine glycinate (from reaction of pyridine and glycine) | 0.056 |
| Isopropyl alcohol | 0.28 |
| Ethylene glycol | 0.10 |

A resinous composition was prepared in accordance with the procedure given under Example 12, using 20 parts urea, 13 parts thiourea, 80 parts neutral formalin, 2.1 parts glycine, 3.9 parts pyridine, 14 parts isopropyl alcohol and 3 parts ethylene glycol. A clear, resinous syrup possessing a very good cure was obtained. The final pH of the syrup was 5.7. Excellent molded articles were produced by dispersing a filler in this resinous material and molding under heat and pressure.

Example 15

| | Mols (approximately) |
|---|---|
| Urea | 1.0 |
| Formaldehyde | 2.0 |
| Glycine | 0.0033 |
| Sodium glycinate (from reaction of NaOH and glycine) | 0.05 |

Four parts glycine and 2 parts NaOH were dissolved in 20 parts water and added to 160 parts of exactly neutral formalin, followed by the addition of 60 parts urea. The mixture was agitated until solution occurred, at which point the pH of the solution was 7.43. The solution was refluxed for 2½ hours, followed by dehydration to a resin content of about 50% with a pH of 5.5. The concentrated syrup was used as described under preceding examples, resulting in excellent moldings and bonded laminations.

Example 16

| | Mols |
|---|---|
| Pyridine | 2 |
| Formaldehyde | 1 |
| Glycine | 1 |
| Biguanide sulphate | 1 |

To 1.59 parts pyridine and 0.75 part glycine in 4 parts water were added 0.81 part formalin and 1.99 parts biguanide sulphate. The resulting mixture was allowed to stand for about 18 hours at room temperature, resulting in a homogeneous yellow solution, which upon evaporation to dryness yielded an orange-colored, sticky powder.

Example 17

| | Mol |
|---|---|
| Acetamide | 1 |
| Formaldehyde | 1 |
| Glycine | 1 |

One part of acetamide, 1.37 parts formalin and 1.27 parts glycine were mixed, resulting in a clear solution which was allowed to stand at room temperature for 48 hours. The solution was evaporated at 70° C., resulting in a light cream-colored material which showed signs of melting with decomposition at about 145° C. and which melted completely at 180° C. The product comprised impure N-(methylene glycine) acetamide,

from which the pure material could be obtained by recrystallization from alcohol or from alcohol-water mixtures. Conversion to the salt derivative is readily accomplished by adding an alcoholic or aqueous solution of an inorganic base. Liquid organic bases may be added directly if so desired. The acetamide in the above example may be replaced by other monoamides, as for example, propionamide, butyramide, caproic acid amide, heptamide, caprylic acid amide, capric acid amide, toluene sulphonamide, benzamide, cyanoacetamide, acetoacetamide, etc. When amides insoluble in the aldehyde are used, the reaction may be facilitated by the use of heat under reflux or by using a mutual solvent aided by heat. Other aldehydes such as acetaldehyde and benzaldehyde, or aldehydes belonging to the unsaturated series, for example acrolein and methacrolein, may be used.

Example 18

| | Mol |
|---|---|
| Acetamide | 1 |
| Formaldehyde | 1 |
| Sodium glycinate (from reaction of glycine and NaOH) | 1 |

Sodium glycinate was prepared by adding 0.68 part NaOH to 1.27 parts glycine in 2 parts water. To the glycinate solution were added 1 part acetamide and 1.37 parts formalin. Heat was liberated from the mixture, and there was obtained a clear, homogeneous solution. Evaporation of this solution at 70° C. resulted in 2.66 parts of a white pasty mass, which was converted to powdered form upon prolonged drying. The product comprised the sodium salt of N-(methylene glycine) acetamide.

From the foregoing description it will be seen that the present invention provides new and useful products produced from salts of amphoteric aminosulphonic acids, including products obtained by effecting reaction between ingredients including a salt of an amphoteric aminosulphonic acid, more particularly a salt of sulphamic acid, e. g., calcium sulphamate, an aldehyde, e. g., formaldehyde, and an organic nitrogen-containing substance having a reactive (reactable) hydrogen atom directly attached to a nitrogen atom thereof, more particularly a compound containing a plurality of amidogen groups, e. g., urea; products obtained by effecting reaction between ingredients including an alkylol sulphamate and an organic nitrogen-containing substance having a reactive hydrogen atom directly attached to a nitrogen atom thereof; products produced by bringing into contact at reaction temperature (1) an organic nitrogen-containing substance having a reactive hydrogen atom attached directly to a nitrogen atom thereof, e. g., urea, and (2) a reaction product of formaldehyde and a salt of an amphoteric aminosulphonic acid, more particularly a salt of sulphamic acid, e. g., calcium sulphamate, the said reaction product containing a methylol grouping; and products produced by reacting together (1) the reaction product of formaldehyde and a salt of an amphoteric aminosulphonic acid, specifically a salt of sulphamic acid, and (2) an organic nitrogen-containing substance having a reactive hydrogen atom directly attached to a nitrogen atom thereof, e. g., urea, the said reaction being effected by the application of heat. The invention also provides methods for the production of the products just mentioned.

Products of this invention are especially suitable for use as fire-retardants, water-repellents and sizings, when applied to wood or the like, or to silk, cotton, wool, synthetic organic fibers, etc., in continuous filament, thread, fabric (woven or felted) or other form. The cellulosic or other fibrous materials to be treated may be surface coated or both coated and impregnated by any suitable means, for example, by spraying with, or immersing in, a solution of the treating agent and thereafter volatilizing the solvent. The resinous condensation products of this invention, alone or in conjunction with other natural or synthetic resinous materials, as for example phenolic resins, alkyd resins, vinyl compounds such as polyvinyl alcohol, polyvinyl acetals, etc., have a wide variety of uses, for instance in the production of laminated and molded products, as casting resins, in paints, varnishes and other protective-surfacing materials, in the manufacture of arc-extinguishing tubes capable of evolving an arc-extinguishing gas under the heat of the arc, in the production of wire or baking enamels, and for other uses.

What I claim as new and desire to secure by Letters Patent of the United States is:

1. The process which comprises effecting reaction between ingredients including a salt of sulphamic acid, formaldehyde and a polyamide selected from the class consisting of urea, thiourea, malonic diamide, succinic diamide, citric triamide and phthalamide.

2. The product obtained by effecting reaction between ingredients including a salt of sulphamic acid, formaldehyde and a polyamide selected from the class consisting of urea, thiourea, malonic diamide, succinic diamide, citric triamide and phthalamide.

3. The process which comprises effecting reaction between ingredients including a salt of sulphamic acid, formaldehyde and urea.

4. The process which comprises effecting reaction between ingredients including a methylol sulphamate and a polyamide selected from the class consisting of urea, thiourea, malonic diamide, succinic diamide, citric triamide and phthalamide.

5. The process which comprises effecting reaction between ingredients including a methylol sulphamate and urea.

6. The process which comprises reacting a salt of sulphamic acid with formaldehyde to form a methylol derivative thereof and thereafter reacting said methylol derivative with a polyamide selected from the class consisting of urea, thiourea, malonic diamide, succinic diamide, citric triamide and phthalamide.

7. The process which comprises reacting a salt of sulphamic acid with formaldehyde to form the methylol derivative thereof and thereafter reacting said methylol derivative with urea.

8. The process which comprises reacting a normal salt of sulphamic acid with formaldehyde and urea.

9. The process which comprises reacting a normal salt of sulphamic acid with formaldehyde to form the methylol derivative thereof and thereafter reacting said methylol derivative with urea.

10. The product obtained by effecting reaction between ingredients including a salt of sulphamic acid, formaldehyde and urea.

11. The method which comprises bringing into contact at reaction temperature (1) a polyamide selected from the class consisting of urea, thiourea, malonic diamide, succinic diamide, citric triamide and phthalamide, and (2) a reaction product of formaldehyde and a salt of sulphamic acid, said reaction product containing a methylol grouping.

12. The product obtained by bringing into contact at reaction temperature (1) a polyamide selected from the class consisting of urea, thiourea, malonic diamide, succinic diamide, citric triamide and phthalamide, and (2) a reaction product of formaldehyde and a salt of sulphamic acid, said reaction product containing a methylol grouping.

13. The product obtained by bringing into contact at reaction temperature (1) urea and (2) a reaction product of formaldehyde and a sulphamate of an alkaline-earth metal, said reaction product containing a methylol grouping.

14. The product obtained by bringing into contact at reaction temperature (1) urea and (2) a reaction product of formaldehyde and a salt of sulphamic acid, said reaction product containing a methylol grouping.

15. The method of preparing new synthetic compositions which comprises reacting (1) a reaction product of formaldehyde and a salt of sulphamic acid with (2) a polyamide selected from the class consisting of urea, thiourea, malonic diamide, succinic diamide, citric triamide and phthalamide, said reaction being effected by the application of heat.

16. The product produced by reacting together (1) the reaction product of formaldehyde and a salt of sulphamic acid and (2) a polyamide selected from the class consisting of urea, thiourea, malonic diamide, succinic diamide, citric triamide and phthalamide, said reaction being effected by the application of heat.

17. The method which comprises reacting the reaction product of formaldehyde and a salt of sulphamic acid with urea, said reaction being effected by the application of heat.

18. The product produced by reacting (1) a polyamide selected from the class consisting of urea, thiourea, malonic diamide, succinic diamide, citric triamide and phthalamide with (2) the reaction product of formaldehyde and a sulphamate of an alkaline-earth metal, said reaction product containing a methylol grouping.

19. The product produced by reacting (1) a polyamide selected from the class consisting of urea, thiourea, malonic diamide, succinic diamide, citric triamide and phthalamide with (2) the product of reaction of formaldehyde and calcium sulphamate, said reaction being effected by the application of heat.

20. The product resulting from the reaction of urea with the reaction product of formaldehyde and calcium sulphamate, said reaction being effected by the application of heat.

GAETANO F. D'ALELIO.